US005379974A

United States Patent [19]

Slay et al.

[11] Patent Number: 5,379,974

[45] Date of Patent: Jan. 10, 1995

[54] ALIGNMENT AND LOCKING MECHANISM FOR EXTENDIBLE JACK STAND

[75] Inventors: Clyde E. Slay, Santa Ana; Harry H. Arzouman, Corona Del Mar, both of Calif.

[73] Assignee: Safe-T-Jack, Inc., Huntington Beach, Calif.

[21] Appl. No.: 872,432

[22] Filed: Apr. 23, 1992

[51] Int. Cl.⁶ .............................................. F16M 11/00

[52] U.S. Cl. ...................................... 248/161; 254/98; 248/408; 248/418

[58] Field of Search ............... 248/161, 407, 408, 409, 248/412, 413, 418; 254/98, 8B

[56] References Cited

U.S. PATENT DOCUMENTS

| | | | |
|---|---|---|---|
| 314,808 | 3/1885 | Denecke | 248/407 |
| 1,091,817 | 3/1914 | Dudgeon | 294/98 |
| 1,223,995 | 4/1917 | Marshall | 254/98 |
| 1,324,058 | 12/1919 | Marchner | 254/98 |
| 1,894,742 | 1/1933 | Harter | 248/413 |
| 2,171,653 | 9/1939 | Heitmann | 248/409 |
| 2,483,395 | 10/1949 | Benson | 248/161 |
| 2,652,272 | 9/1953 | Wood | 248/407 |
| 2,662,712 | 12/1953 | Rose | 248/408 |
| 2,842,387 | 7/1958 | Della-Porta | 248/413 |
| 3,870,278 | 3/1975 | Lee | 254/98 |
| 4,641,813 | 2/1987 | Arzoumann | 254/8 B |
| 4,960,264 | 10/1990 | Arzouman et al. | 254/8 B |
| 5,110,089 | 5/1992 | Slay | 248/8 B |

*Primary Examiner*—David A. Scherbel
*Assistant Examiner*—Korie H. Chan
*Attorney, Agent, or Firm*—Gene W. Arant

[57] ABSTRACT

An extendible multi-frame stand includes at least three frames arranged in a telescoping relationship, having a single coherent alignment and locking mechanism which includes alignment means for preventing relative rotation between the first and second frames, alignment means for preventing relative rotation between the second and third frames, means for locking the second and third frames at the limits of their longitudinal extension positions, and cam-operated releasable locking means for controlling extension and retraction of the second and third frames relative to each other and to the first frame.

2 Claims, 5 Drawing Sheets

ALIGNMENT AND LOCKING MECHANISM FOR EXTENDIBLE JACK STAND

RELATED APPLICATION

A related copending patent application assigned to the same assignee as the present application is "Extendible Jack Stand", Ser. No. 07/503,297 filed Apr. 2, 1990 by Clyde E. Slay, now U.S. Pat. No. 5,110,089 issued May 5, 1992.

PRIOR ART

A jacking system that includes a mechanical jack stand which is remotely controlled by a power unit selectively attached to the mechanical stand is shown in U.S. Pat. No. 4,462,569 issued to Harry H. Arzouman. U.S. Pat. No. 4,960,264 for ALIGNMENT AND RELEASE MECHANISM FOR TWO-PART JACK SYSTEM, issued to Clyde E. Slay and Harry H. Arzouman, shows an improved form of the same system. Copending application Ser. No. 07/503,297, now U.S. Pat. No. 5,110,089 issued May 5, 1992, to Clyde E. Slay, shows an EXTENDIBLE JACK STAND adapted for use in that improved system.

BACKGROUND OF THE INVENTION

Copending application Ser. No. 07/503,297, now U.S. Pat. No. 5,110,089 issued May 5, 1992, shows an extendible jack stand including a first or bottom frame, second and third elongated upper frames that are normally arranged in telescoping relationship, and releasable locking means that is cam-actuated for automatically locking or unlocking the third frame relative to the second frame. The releasable locking means is quiescent while the third frame is being raised or extended, but when the third frame reaches its limit of extension is cam-actuated to automatically lock the third frame to the second. During retraction, the second frame remains locked to the third frame until the second frame has been fully retracted into the first frame.

As shown in the copending application, it is desirable to maintain the relative rotational alignment of the frames so that none will rotate about its longitudinal axis relative to another, and also to positively lock the adjacent frames at their limits of longitudinal movement relative to each other so that they cannot be inadvertently pulled apart.

Experience has shown that in certain situations the locking action both for rotational alignment and for the limits of extension needs to be very positive; for example, where a misalignment between the associated power unit and the jack stand has occurred, the power unit might overpower the jack stand and pull it apart, unless it is very positively locked.

Thus it is important to achieve optimum operation of the alignment means for preventing relative rotation of the frames; of the locks for limiting the longitudinal extension positions of the frames; and of the releasable locking means that automatically locks or unlocks the third frame relative to the second frame.

SUMMARY OF THE INVENTION

According to the invention an extendible multi-frame stand of the type that includes alignment means for preventing relative rotation of the frames, means for locking the frames at the limits of their longitudinal extension positions, and cam-operated releasable locking means for controlling extension and retraction of the frames, is improved by integrating all of these functions in a single coherent alignment and locking mechanism.

Thus the object and purpose of the present invention is to provide a single coherent alignment and locking mechanism for an extendible jack stand, which incorporates a number of different alignment and locking functions in a single mechanism so that the product is economical to manufacture, is rugged and reliable in operation, and is easy to disassemble if that becomes necessary for purpose of maintenance or replacement of parts.

DRAWING SUMMARY

DETAILED DESCRIPTION

(FIGS. 1 through 8)

Figure 1:
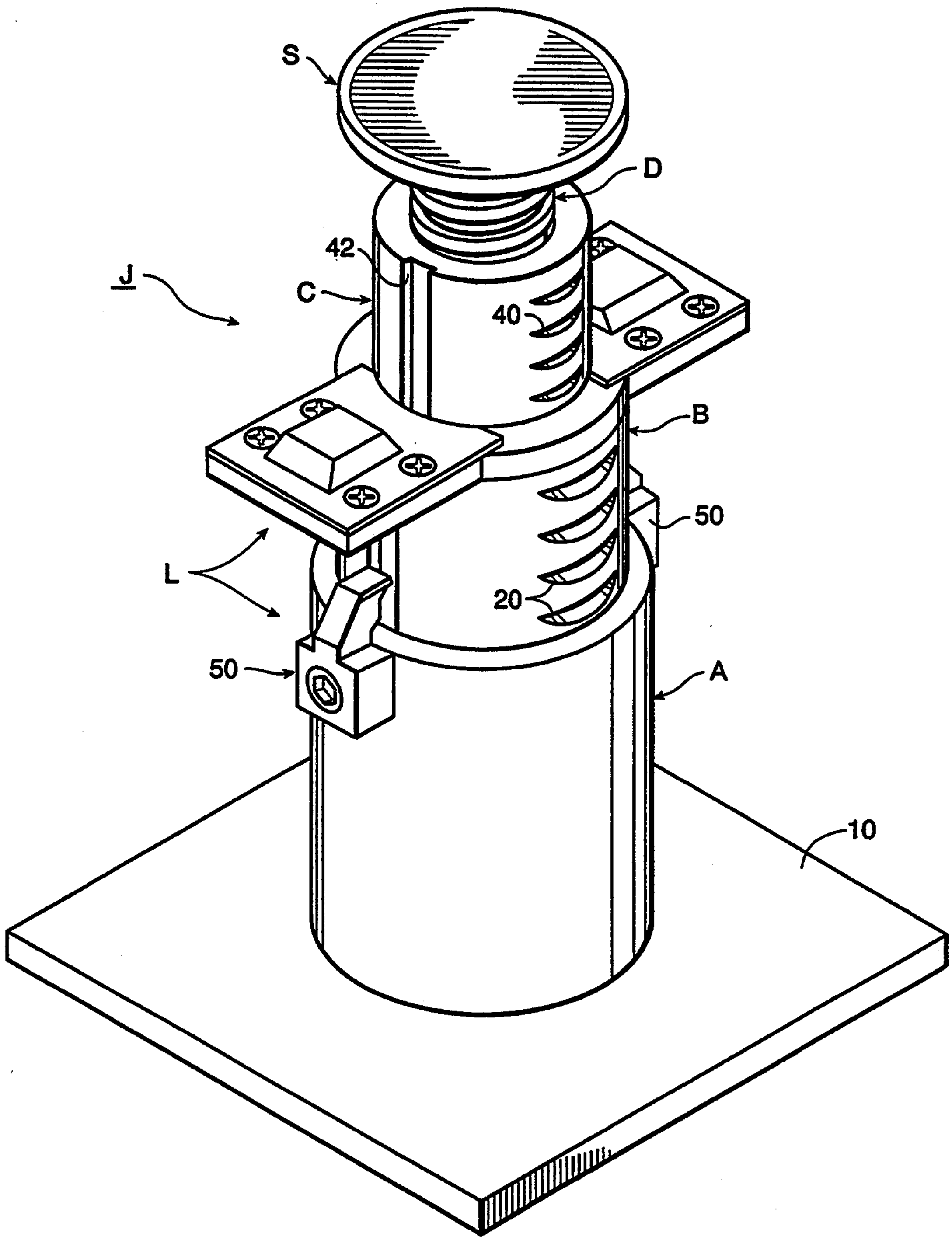
FIG. 1 is a perspective view of an extendible jack stand in accordance with the presently preferred form of the invention, having four vertical frames, and with its second and third frames in fully extended position.

OVERALL ARRANGEMENT:

Referring now to the drawings, an extendible jack stand J includes a horizontal base assembly 10, a first hollow cylindrical frame A is fixedly attached to the base assembly and extends vertically above it, a second hollow cylindrical frame B which is telescopically received within the frame A, a third vertical frame C which is telescopically received within the frame B, and a fourth vertical frame D which is screw-threaded into the upper end of frame C. Stand J also includes a load-bearing plate S on the upper end of frame D; and, as more fully shown in the referenced prior patents, ratchet mechanisms for establishing a precise extension position of the jack stand assembly, and a lifting plate on the upper end of frame C.

The purposes of the jack stand and its mode of use will be best understood by reference to the issued U.S. Pat. Nos. 4,462,569, 4,960,264, and 5,110,089. Ratchet teeth 20 on frame B and ratchet teeth 40 on frame C are parts of a complete ratchet system. The use of the fourth frame D is optional; it may, if desired, be removed, and the top plate of frame C (not specficially shown in the present drawings) may then be used as the load-bearing plate.

The illustrated extendible multi-frame stand is of the type shown in U.S. Pat. No. 5,110,089 which includes alignment means for preventing relative rotation of the frames, means for locking the frames at the limits of their longitudinal extension positions, and cam-operated releasable locking means for controlling extension and retraction of the frames. According to the present invention the stand has been improved by integrating all of these functions in a single coherent alignment and locking mechanism.

DETAILED DESCRIPTION OF ALIGNMENT AND LOCKING MECHANISM:

The coherent alignment and locking mechanism of the present invention exists in duplicate, one on each side of the jack. Wherever the present description refers to only one such mechanism, it will be understood that there is another identical mechanism on the other side of the jack stand, 180 degrees away from the one illustrated. The coherent alignment and locking mechanism of the present invention is generally identified in FIG. 1 by letter L.

Figure 2:
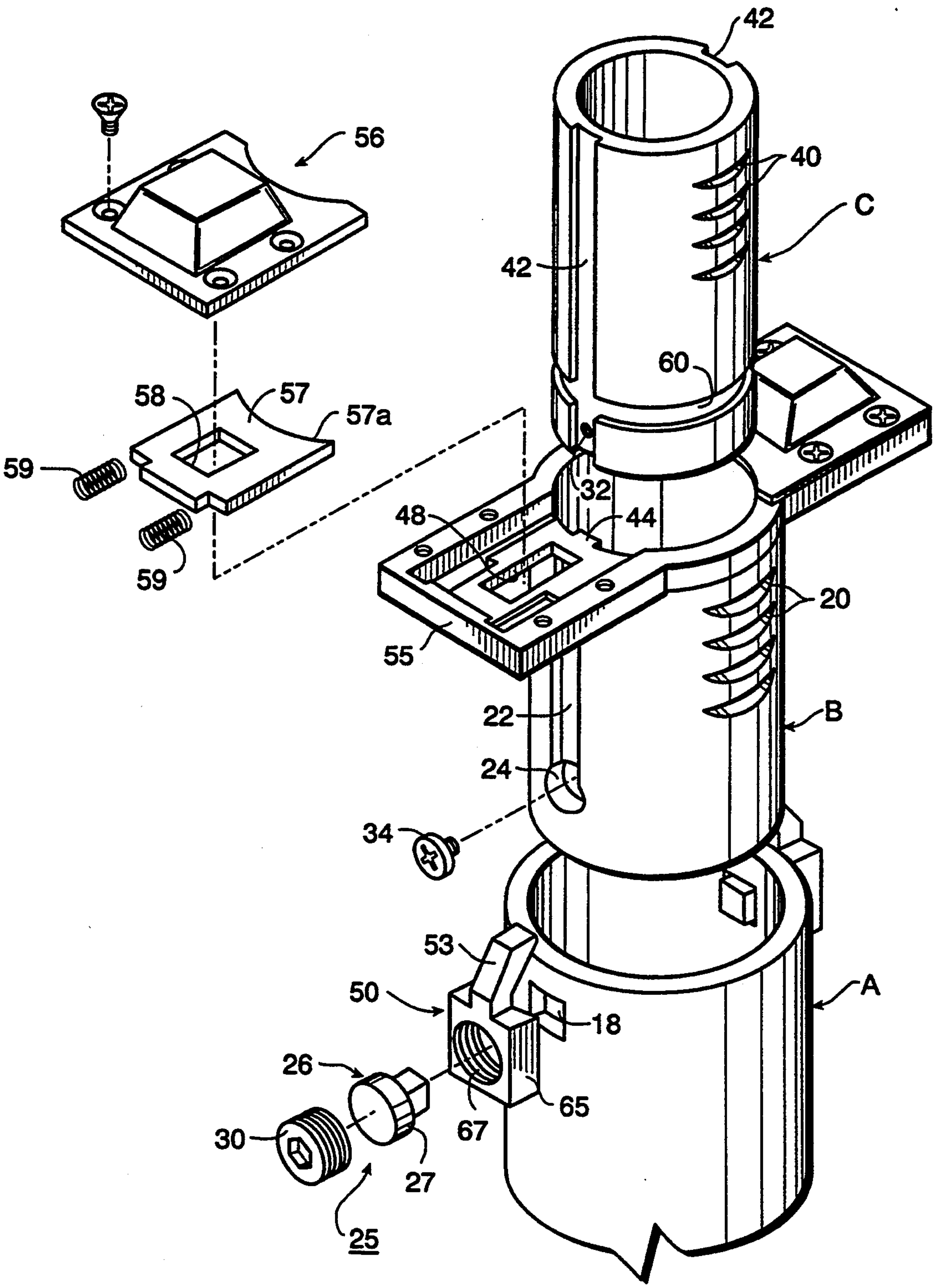
FIG. 2 is an exploded perspective view showing all the working parts of the alignment and locking mechanism.
Figure 3:
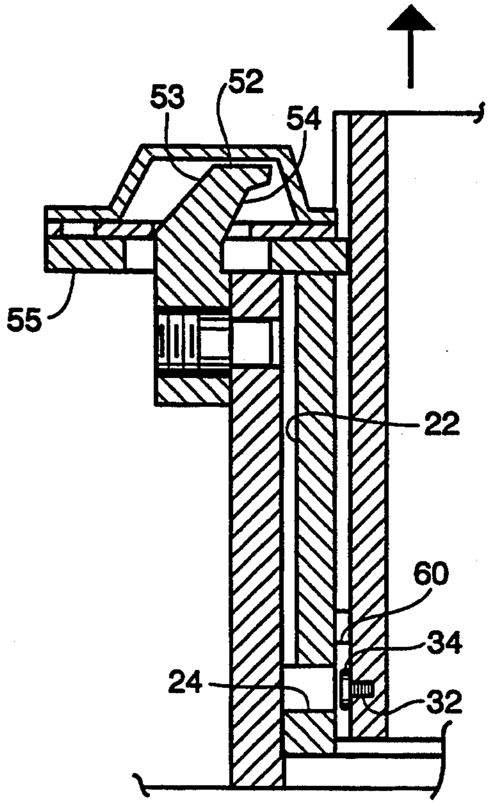
FIG. 3 is a fragmentary cross-sectional elevation view showing the second and third frames fully retracted into the first frame.

The alignment and locking mechanism will first be described in the fully assembled state of the jack stand with frames B and C fully retracted, as shown in FIG. 3. Reference should also be had to FIGS. 1 and 2 for easy identification of the parts.

At one point on the circumference of the outer wall surface of hollow cylindrical frame B there is formed a vertical groove 22, best seen in FIG. 2, which extends from the very top of frame B throughout most of its length almost to its bottom end. Its purpose is to maintain the rotational orientation of the ratchet teeth 20 relative to base assembly 10. Groove 22 is located 90 degrees from each row of the ratchet teeth 20. The lower end of longitudinal groove 22 in frame B terminates in a round hole 24 that is located somewhat above the bottom end of frame B and extends all the way through the wall of the frame.

Frame C, also a hollow cylindrical member, has vertical rows of ratchet teeth 40 formed on two opposite sides of its outer wall surface. In order to maintain the rotational orientation of the ratchet teeth 40 relative to base assembly 10 there is a vertical groove 42 formed at one point on the circumference of the outer wall surface of frame C and which extends throughout the entire length of frame C.

Another feature of the alignment and locking mechanism is a circumferential groove 60 formed about the outer surface of third frame C near its lower end, to limit the longitudinal extension of frame C relative to frame B. It will be noted that longitudinal groove 42 extends below circumferential groove 60 and entirely to the lower extremity of frame C. In the portion of groove 42 that lies below groove 60 there is a threaded opening 32. A small screw 34 screwed into that opening is utilized to limit the longitudinal extension of frame C relative to frame B.

According to the present invention the releasable locking means includes a locking finger 50 fixedly secured to an outer surface of the upper end of first frame A and extending vertically upwardly therefrom. The locking finger 50 has an upper end 52 which extends above the upper end surface of frame A and which is bent or curved inwardly, toward the radial center of the hollow frames. The upper end 52 of finger 50 has an outer camming surface 53 and an inner camming surface 54.

The locking finger also has a laterally widened base 65 with a threaded opening 67 therethrough. There is an aligned square opening 18 in the wall of frame A. A removable key means 25 occupies the openings 67 and 18. The removable key means 25 includes a solid key member 26 having a flat circular head 27 and a key body 28 extending perpendicularly from the head and which is of square cross-section and of lesser diameter than the head. The key body 28 extends through opening 18 in a relatively tight-fitting relationship. The head 27 of key member 26 is retained by a threaded nut 30 located in the outer portion of threaded opening 67. Head 27 of key member 26 is too large to pass into opening 18.

The square end of square key body 28 normally protrudes into the longitudinal groove 22 of frame B to prevent frame B from rotating relative to frame A. As frame B is extended or retracted relative to frame A, two flat sides of key body 28 slidingly engage the two side walls of groove 22, providing a very firm support. The key member 26 not only maintains the rotational alignment of frame B relative to frame A, but in cooperation with opening 24 also limits the upward extension movement of frame B relative to frame A.

A second part of the releasable locking means is a guide member 55, fixedly attached upon the upper end of frame B and extending horizontally outwardly. Guide member 55 is generally in the form of a plate having the under surface of its inner end welded upon the upper end face of the wall of frame B. The guide member also has a central opening 48 for the associated locking finger 50 to pass through. The inner end of guide member 55 has a protrusion 44 which, in the assembled state of the mechanism, engages groove 42.

Preferably the two guide members 55 are integrally formed from a single plate, as shown in FIG. 2.

A latch member 57 in the form of a flat plate is slidably supported within the guide member 55. The latch member has a central opening 58 through which the associated finger 50 may extend. In the assembled state of the mechanism, an associated pair of springs 59, shown only in FIG. 2, urge the latch member radially inwards toward the radial center of frame B. A cover member 56 covers the latch member 57 as well as the upper surface of guide member 55.

It will be noted in FIG. 3 that screw 34 is spaced beneath the circumferential groove 60 by the thickness of protrusion 44. This relationship is important in order to provide the camming action shown in FIG. 5.

Guide member 55 is so positioned relative to frame B that its inward protrusion 44 is aligned directly above the longitudinal groove 22 of frame B. This relationship is important in order to maintain the location of the alignment and locking mechanism 90 degrees from each set of ratchet teeth 20 and 40. It is also important for the assembly and disassembly of the jack stand.

ASSEMBLY PROCEDURE:

The assembly procedure may be accomplished as follows.

The two locking fingers 50 are welded to respective sides of frame A with openings 67 aligned with openings 18.

The dual guide plate 55, 55, is welded to the upper flat face of frame B.

Frame B is partially inserted within frame A so that openings 24 are aligned with openings 18. At the same time, frame C is partially inserted into frame B by seating protrusions 44 of the guide members in grooves 42; frame C is then lowered until threaded openings 32 are aligned with openings 24 and 18. At that time the screws 34 are inserted through openings 67 and 18 into opening 32. These screws then hold frames B and C together in a longitudinally slidable relationship.

Frame B is then inserted further into frame A until the upper ends 52 of the locking fingers 55 pass through openings 48 of the guide members. The latch plates 57 are then installed with their openings 58 enclosing the upper ends 52 of the fingers 55. Then springs 59 are installed at the outer ends of each latch plate, confined by an outer end wall of the guide member 55. Then the cover plate 56 is secured over each guide member and latch plate to prevent the latch plates or springs from being displaced.

As a final step, removable key members 26 are inserted into openings 67 and 18, and secured by threaded nuts 30.

OPERATION:

The camming operation of locking finger 50 in conjunction with slidable latch plate 57 is essentially as described in copending application Ser. No. 07/503,297, now U.S. Pat. No. 5,110,089. Some vertical movement of frame B relative to frame A is required to invoke that camming action, during either extension or retraction movements. The sloping upper end 52 of finger 50 is designed to control the radially inward or radially outward movement of the associated latch member 57, in cooperation with springs 59.

Figure 4:
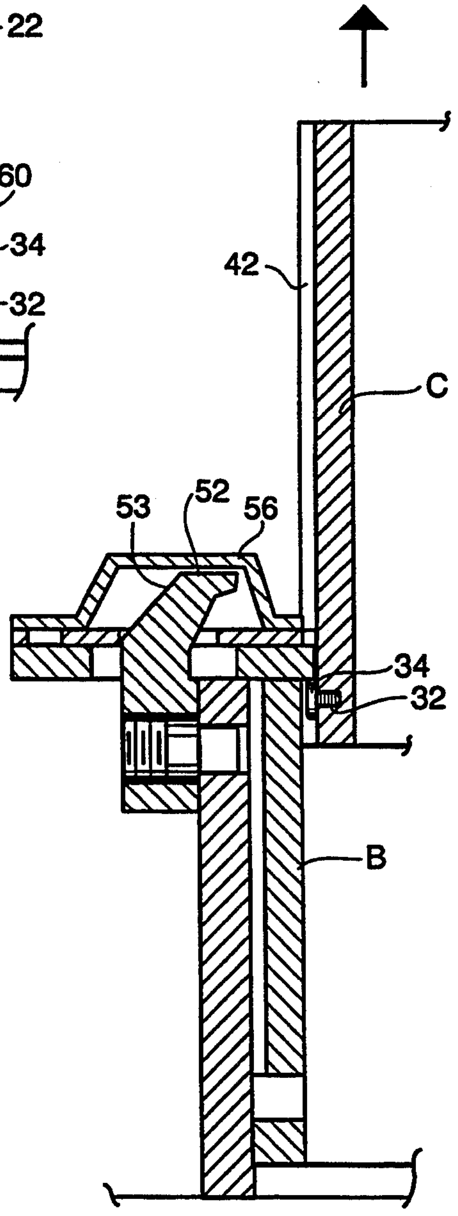
FIG. 4 is a fragmentary cross-sectional view like FIG. 3, but showing the third frame almost fully extended relative to the second frame.
Figure 5:
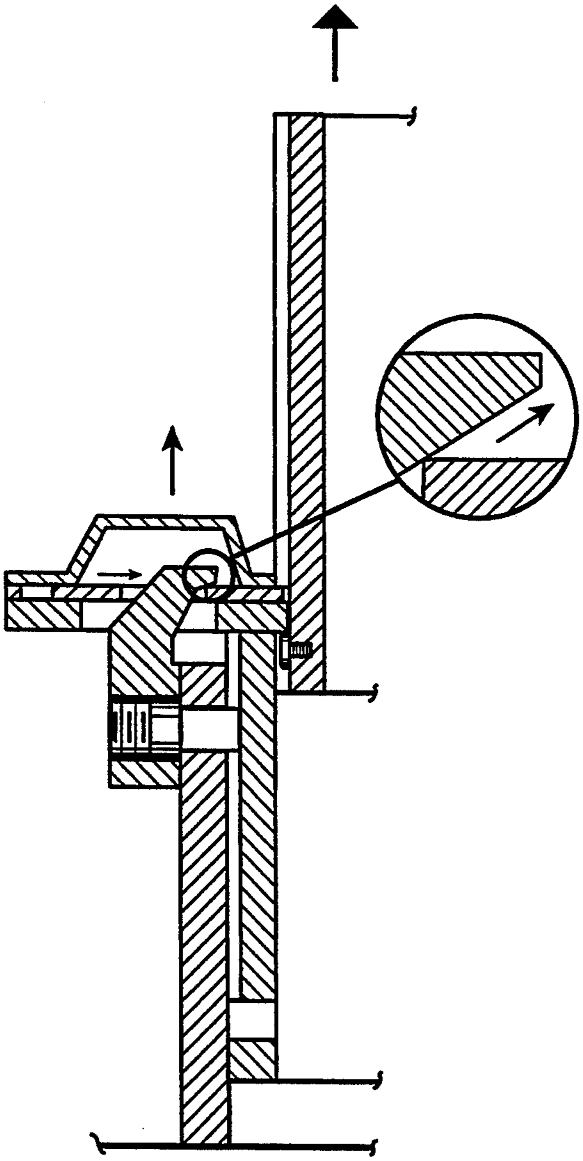
FIG. 5 is a fragmentary cross-sectional view like FIG. 4, but showing the third frame further extended and starting to lift the second frame, and the releasable locking means being cam-actuated to lock the third frame to the second frame.

In brief, when frame C is first lifted up as shown in FIG. 3 the weight of frame B suffices to hold it down inside frame A. As shown by FIGS. 4 and 5, the further upward movement of frame C causes a camming action of latch plate 57 to occur on the inner cam surface 54 of finger 50. When the third frame C becomes fully extended relative to the second frame B as shown in FIG. 4, the heads of screws 34 abut the undersurfaces of the protrusions 44 of guide members 55, urging frame B upwards as seen in FIG. 5. The spring means 59 then urge the latch plate 57 to slide toward frame C, and its arcuately curved end **57*a* engages the groove 60** of the third frame C and thereby securely locks frame C to frame B.

Figure 6:
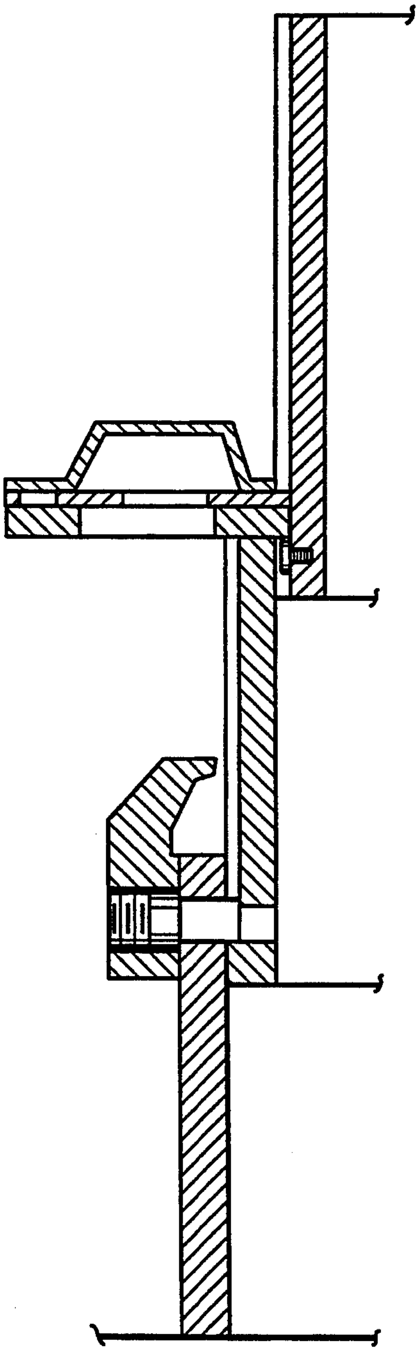
FIG. 6 is a fragmentary cross-sectional view like FIG. 5, but showing the third frame fully extended relative to the second frame and firmly locked in that limit position of extension, and the second frame fully extended and firmly locked relative to the first frame.

At the position of maximum upward extension as shown in FIG. 6 the square key body 28 of key member 26 is held firmly in place by its tight-fitting relationship to hole 18, and its square end provides a strong support to the associated hole 24 at the lower end of groove 22 in frame B to prevent that frame from being pulled upwardly. At the same time, protrusions 44 engaging the heads of screws 34 and latch plate ends **57*a* engaging groove 60** provide a solid retentive support for upper frame C relative to frame B.

Figure 7:
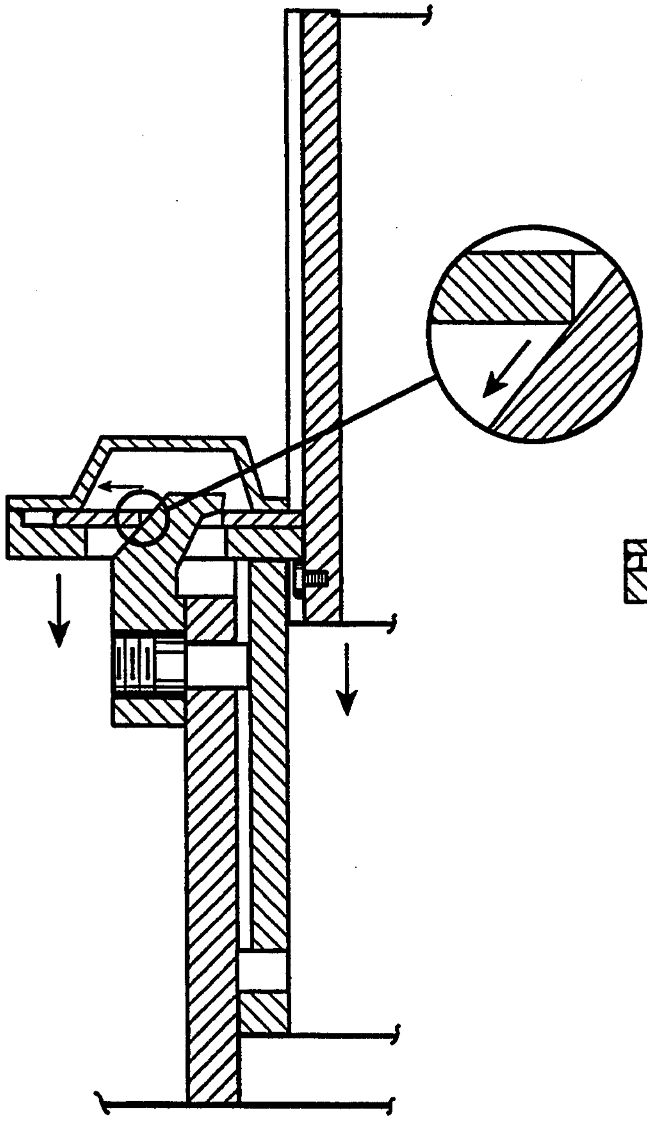
FIG. 7 shows the third frame having been lowered until the second frame is nearly retracted relative to the first frame, and the releasable locking means in process of switching back to its quiescent state for unlocking the third frame from the second frame.
Figure 8:
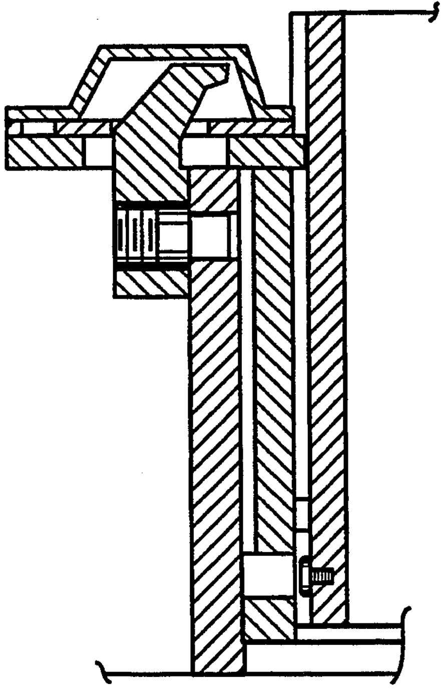
FIG. 8 shows the second and third frames having regained their fully retracted positions as in FIG. 3.

When frame C is to be lowered as shown in FIG. 7 a reverse camming action takes place, with latch plate 57 engaging the outer camming surface 53 of the locking finger 50. The latch member and the finger cooperatively respond to the arrival of the frame B at its fully retracted position for withdrawing the latch plate from groove 60 in the third frame, thereby causing the second frame B to be retracted into the first frame A before third frame C can be retracted into second frame B.

The invention has been disclosed in considerable detail in order to fulfill the requirements of the patent laws. The scope of the invention, however, is to be determined only with reference to the appended claims.

What I claim is:

1. An extendible stand comprising:

first, second, and third cylindrical frames normally arranged in vertically telescoping relationship, said first frame having an outer wall;

releasable locking means including a locking finger fixedly secured to an outer surface of the upper end of said first frame and extending vertically upwardly therefrom, a latch guide secured on the upper end of said second frame and extending radially outwardly therefrom, and a latch plate supported on said latch guide and extending radially inwardly over the upper end of said second frame, said latch plate being slidable in said latch guide;

a circumferential groove on the outer surface of said third frame near its lower end;

spring means coacting between said locking finger and said latch plate to urge said latch plate inwardly over the upper end of said second frame and against the outer surface of said third frame for engaging said circumferential groove when said third frame is in its position of maximum extension relative to said second frame, so as to lock said third frame in said position;

said locking finger and said latch plate cooperatively providing camming means responsive to longitudinal movement of said second frame relative to said third frame for either locking or unlocking said third frame;

said third frame also having a longitudinal groove therein, said latch guide having a protrusion which extends into said longitudinal groove of said third frame for maintaining the rotational alignment of said third frame relative to said second frame;

said second frame also having a longitudinal groove therein;

said locking finger having a widened base with an opening therein, and said wall of said first frame having an opening aligned with said opening in said locking finger;

removable key means occupying said opening in said locking finger and extending into said longitudinal groove of said second frame for maintaining the rotational alignment of said second frame relative to said first frame; and removable stop means at the bottom of said longitudinal groove of said third frame for permitting said third frame to be disassembled from said latch guide protrusion and hence from said second frame.

2. An extendible stand as in claim 1 wherein said removable key means includes a solid key member having a flat circular head and a square body extending perpendicularly from said head and which is of lesser diameter than said head, said opening in the wall of said first frame being square and said square body being of such size as to interfit in said opening in said first frame wall, said flat circular head being of larger diameter than said opening in the wall of said first frame; said square body normally protruding into said longitudinal groove of said second frame; said opening in said locking finger having an outer portion which is threaded; and said removable key means also including a threaded nut which is insertable in said threaded opening for securely retaining said key member in an operative position.

* * * * *